United States Patent
Amano

(10) Patent No.: US 9,736,624 B2
(45) Date of Patent: Aug. 15, 2017

(54) COMMUNICATION DEVICE, COMMUNICATION DEVICE CONTROL METHOD AND PROGRAM

(71) Applicant: CANON KABUSHIKI KAISHA, Tokyo (JP)

(72) Inventor: Ryosuke Amano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/956,985

(22) Filed: Dec. 2, 2015

(65) Prior Publication Data
US 2016/0165384 A1 Jun. 9, 2016

(30) Foreign Application Priority Data
Dec. 4, 2014 (JP) .................................. 2014-246353

(51) Int. Cl.
*H04B 1/00* (2006.01)
*H04B 5/00* (2006.01)
*H04W 36/24* (2009.01)
*H04W 4/00* (2009.01)

(52) U.S. Cl.
CPC .................................. *H04W 4/008* (2013.01)

(58) Field of Classification Search
CPC ... H04W 4/008; H04W 36/005; H04W 36/24; H04B 5/0025; H04B 1/005
See application file for complete search history.

(56) References Cited

U.S. PATENT DOCUMENTS

| | | | | |
|---|---|---|---|---|
| 2008/0168246 A1* | 7/2008 | Haustein | ............. | G06F 11/2071 711/162 |
| 2009/0237721 A1* | 9/2009 | Jeong | ..................... | G06F 3/1208 358/1.15 |
| 2011/0275316 A1* | 11/2011 | Suumaki | ............. | G06K 7/10237 455/41.1 |
| 2014/0168681 A1* | 6/2014 | Nakamura | ............. | G06F 3/1276 358/1.13 |
| 2014/0297892 A1* | 10/2014 | Kaigawa | ............... | G06F 3/1204 710/5 |

FOREIGN PATENT DOCUMENTS

| | | |
|---|---|---|
| JP | 2007-221355 A | 8/2007 |
| JP | 5120417 A | 1/2013 |
| JP | 2014-192695 A | 10/2014 |

* cited by examiner

*Primary Examiner* — Andrew Wendell
(74) *Attorney, Agent, or Firm* — Canon U.S.A. Inc. IP Division

(57) ABSTRACT

A communication device performs a first writing of writing, to a memory, one of application information used to activate an application and setting information used to establish communication with a second wireless communication system, transmits the written information to a communication partner device via a first wireless communication unit, performs a second writing of writing, to the memory, in a case where the transmission is performed, either the application information or the setting information, whichever was not previously written, and transmits the information written in the second writing to the communication partner device via the first wireless communication unit, in a case where the communication starts in a condition that the writing is being performed.

19 Claims, 9 Drawing Sheets

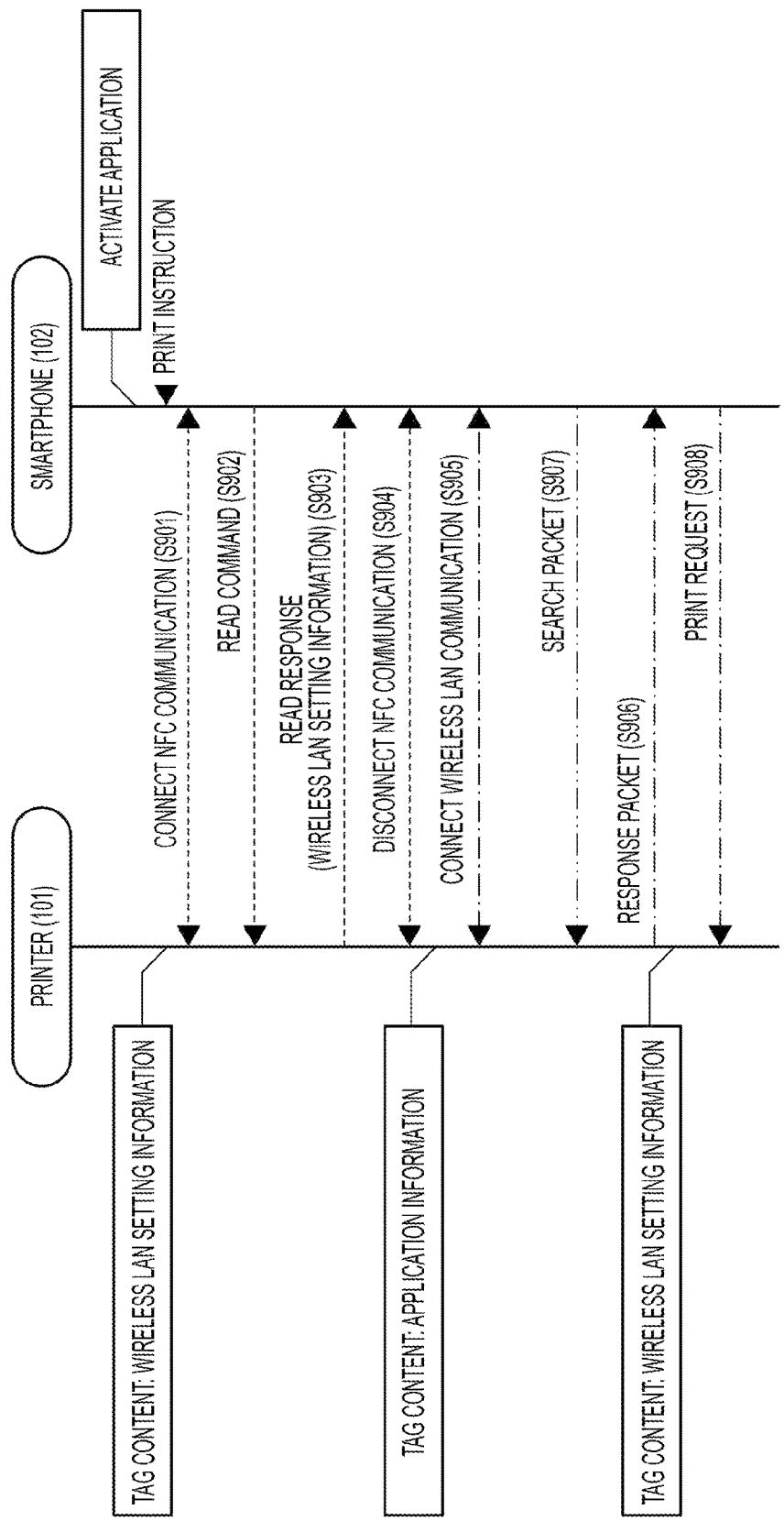

COMMUNICATION DEVICE, COMMUNICATION DEVICE CONTROL METHOD AND PROGRAM

BACKGROUND

Field

Aspects of the present invention generally relate to a communication technique.

Description of the Related Art

Conventionally, mobile terminals compatible with short range wireless communication such as NFC (Near Field Communication), IrDA (Infrared Data Association), TransferJet (registered trademark) or the like are known. In short range wireless communication, data can be transmitted and received between devices by simple operation such as putting the devices close to each other (Japanese Patent Application Laid-Open No. 2007-221355).

Further, there is a technique to perform a handover from such short range wireless communication to a different wireless communication system such as a wireless LAN (IEEE 802.11 series), Bluetooth (registered trademark) or the like. Here, the handover is an action to switch from communication by a first communication path as a first communication method to communication by a second communication path as a second communication method.

Further, there is a function that, when data including information related to an application is received via NFC, the application indicated by the information is automatically activated.

SUMMARY

A communication device includes a first wireless communication unit configured to transmit information stored in a memory to a communication partner device via a first wireless communication system of short range wireless communication, a second wireless communication unit configured to communicate with the communication partner device via a second wireless communication system which is different from the first wireless communication system, a first write unit configured to write to the memory one of application information used to activate an application and setting information used to establish communication with the second wireless communication system, a first transmission unit configured to transmit the information written by the first write unit to the communication partner device via the first wireless communication unit, a second write unit configured to write to the memory, in a case where the transmission by the first transmission unit is performed, either the application information or the setting information, whichever was not written by the first write unit, and a second transmission unit configured to transmit the information written by the second write unit to the communication partner device via the first wireless communication unit in a case where the communication by the first wireless communication unit starts in a condition that the writing by the second write unit is being performed.

Further features of the present disclosure will become apparent from the following description of exemplary embodiments with reference to the attached drawings.

BRIEF DESCRIPTION OF THE DRAWINGS

FIG. 9 is a diagram illustrating a communication sequence chart between the printer and the smartphone.

DESCRIPTION OF THE EMBODIMENTS

As described above, it has been proposed to use a short range wireless communication such as NFC in various processes. However, the process realized between the same pair of devices using short range wireless communication is a single process and it has not been considered to realize more than one processes between the same pair of devices using the short range wireless communication.

The following embodiments have an object to realize more than one processes using short range wireless communication.

Figure 1:
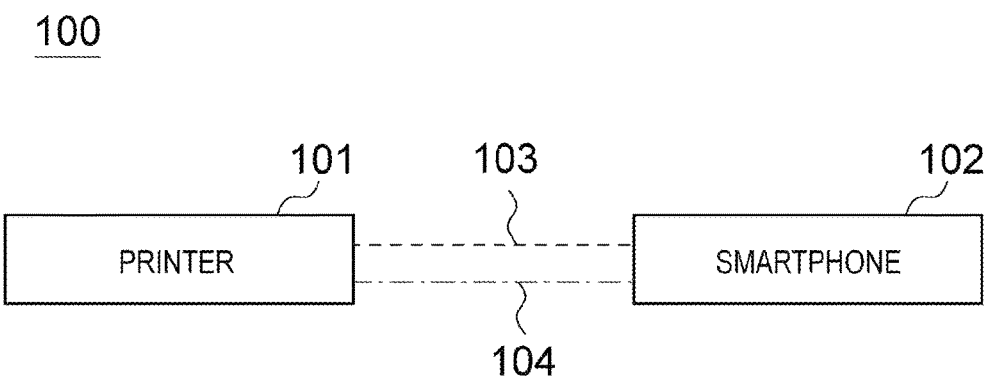
FIG. 1 is a diagram illustrating an example of a communication system configuration.

Hereinafter, a communication device and a communication system according to the present embodiment will be explained in detail with reference to the drawings. FIG. 1 is a diagram illustrating a device structure of a system 100 which is considered in the following embodiments. The references 101 and 102 represent communication devices according to the present embodiment and, in the present embodiment, 101 represents a printer and 102 represents a smartphone. Here, the devices of the communication system according to the present embodiment will be explained as a printer and a smartphone; however, the devices may be a digital camera, a personal computer, a video camera, a smartwatch, a PDA and the liked for example.

The smartphone 102 can communicate with the printer 101 using NFC (Near Field Communication) communication 103 which is short range wireless communication. Here, in the present embodiment, the smartphone 102 communicates in a reader/writer mode defined in a NFC Forum and the printer 101 communicates in a card emulation mode defined in the NFC Forum. Here, the reader/writer mode is a mode to read and write data from and to a memory of a device that operates in the card emulation mode. Further, the card emulation mode is a mode to read and write data from and to a memory from a device that operates in the reader/writer mode. Here, the NFC communication 103 between the smartphone 102 and the printer 101 may be bidirectional communication in a P2P mode defined in the NFC Forum. Further, the printer 101 and the smartphone 102 can communicate with each other using wireless LAN communication 104.

Figure 2:
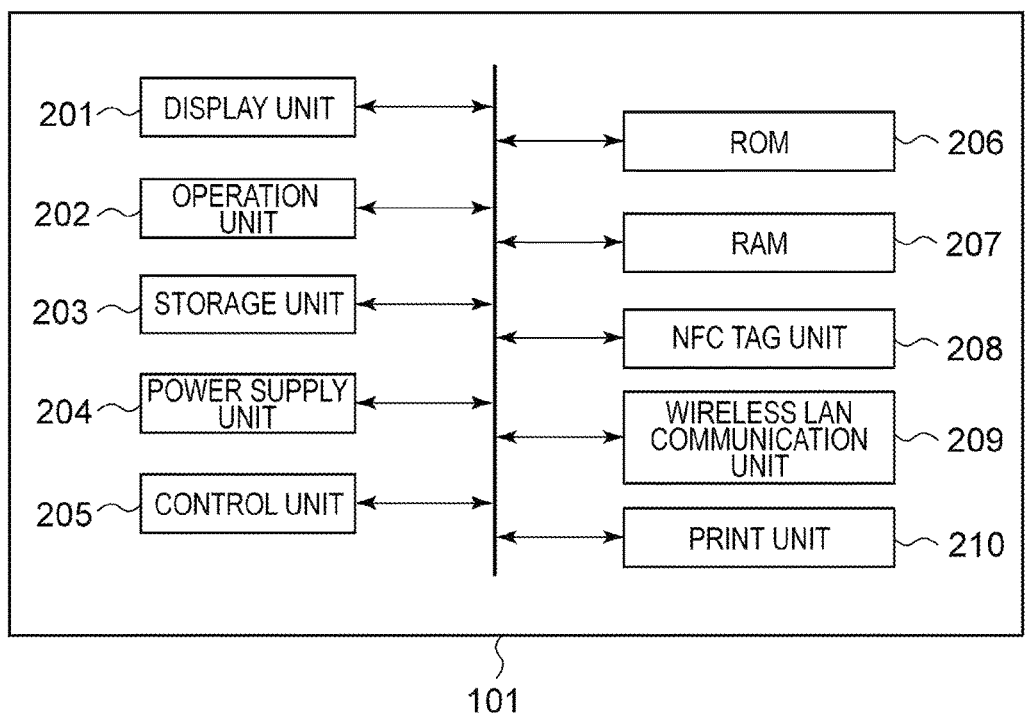
FIG. 2 is a diagram illustrating an example of a hardware configuration of a printer.

Next, FIG. 2 is a diagram illustrating a hardware configuration of the printer 101. The printer 101 includes a display unit 201, an operation unit 202, a storage unit 203, a power supply unit 204, a control unit 205, a ROM 206, a RAM 207, an NFC tag unit 208, a wireless LAN communication unit 209, and a print unit 210.

The display unit 201 is composed of an LCD or an LED for example, has a function to output information which can be visually recognized by a user, and displays various user interfaces. The operation unit 202 has a function so that the user can perform various inputs or the like and operate the communication device. The storage unit 203 is composed of, for example, an HDD, a flash memory or a removable storage medium such as an SD card, stores and manages various pieces of data such as wireless communication network information, data transmission/reception information, image data and the like. The power supply unit 204 is, for example, an AC (Alternating Current) power supply, acquires power to operate the overall device via an outlet, and supplies the power to each hardware.

The control unit 205 is, for example, a CPU (Central Processing Unit) and controls operation of each component element of the printer 101. The ROM 206 stores a control instruction which is a program, and later described various operations are realized by the control unit 205 executing a control program stored in the ROM 206. The RAM 207 is used to temporarily store work memory or data during the execution of the program.

The reference number 208 represents the NFC tag unit that performs the NFC communication 103. The NFC tag unit 208 internally includes a non-volatile memory so that data can be read or written from and to the memory by the reader/writer via the NFC communication 103. The NFC tag unit 208 performs wireless communication compliant with communication regulations defined in the NFC Forum. Here, regarding the memory of the NFC tag unit 208, stored information can be rewritten internally by the control unit 205 and the stored information can be rewritten by writing from a reader/writer which is an external device. Further, upon detecting a communicatable device within a communication range, the NFC tag unit 208 automatically established the NFC communication 103 and automatically transmits information stored in the memory in response to a read command from the communication partner device. Here, it has been assumed that the NFC tag unit 208 performs wireless communication compliant with the NFC standard; however, for example, the communication may be other short range wireless communication such as infrared communication (IrDA), Transfer Jet, and the like or other wireless communication methods. Further, the NFC tag unit 208 may use Bluetooth (registered trademark) Low Energy (BLE) method which is defined by Bluetooth (registered trademark) 4.0.

The wireless LAN communication unit 209 performs the wireless LAN communication 104. The wireless LAN communication unit 209 performs wireless communication compliant with IEEE (The Institute of Electrical and Electronics Engineers, Inc.) 802.11 series. Here, it is assumed that the wireless LAN communication unit 209 performs wireless communication compliant with IEEE 802.11 series in the present embodiment; however, other communication method such as Bluetooth (registered trademark) or the like can be used. The print unit 210 is a hardware element to execute printing.

Figure 3:
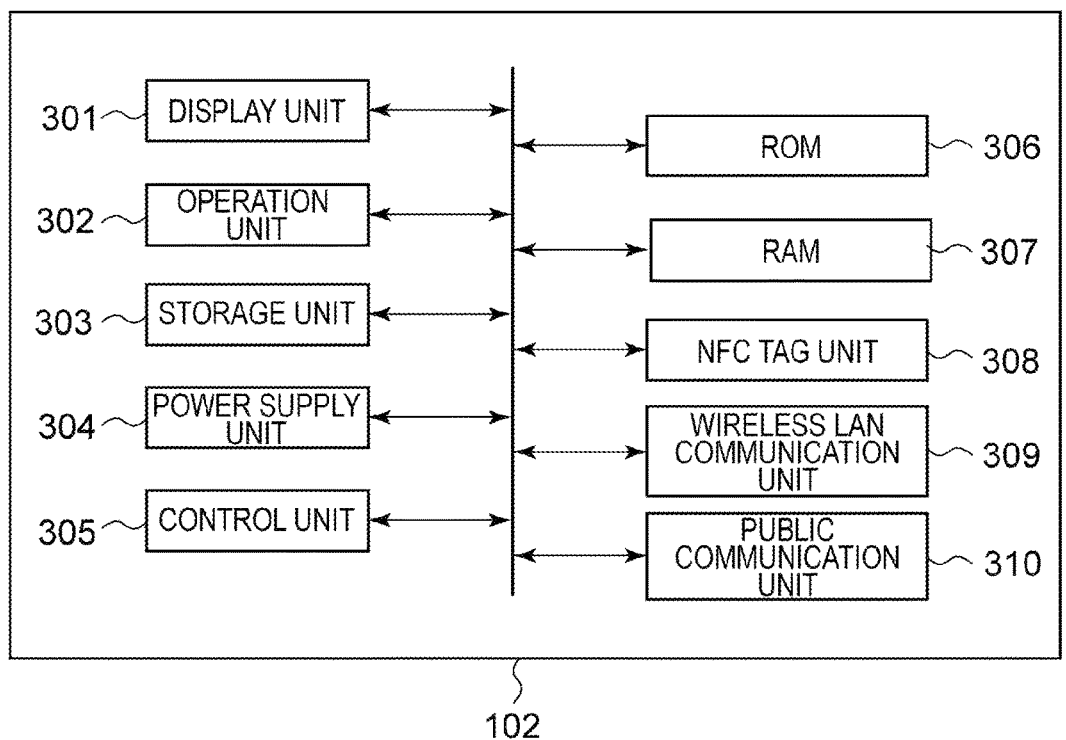
FIG. 3 is a diagram illustrating an example of a hardware configuration of a smartphone.

Next, a hardware configuration of the smartphone 102 will be explained with reference to FIG. 3. The smartphone 102 includes a display unit 301, an operation unit 302, a storage unit 303, a power supply unit 304, a control unit 305, a ROM 306, a RAM 307, an NFC communication unit 308, a wireless LAN communication unit 309 and a public communication unit 310. The display unit 301 is composed of, for example, an LCD or an LED, has a function to output information which can be visually recognized by a user, and displays various user interfaces. The operation unit 302 has a function so that the user can perform various inputs and operate the communication device. Here, the display unit 301 and the operation unit 302 may be integrally formed as a touch panel or the like.

The storage unit 303 is composed of a storage medium such as an HDD, a flash memory, a removable SD card or the like for example, stores and manages various data such as wireless communication network information, data transmission/reception information, image data, application, or the like. The power supply unit 304 is a battery for example, maintains power supply for operating the entire device, and supplies the power to each hardware.

The control unit 305 is a CPU for example, and controls operation of the entire device of the smartphone 102. The ROM 306 stores a control instruction, which is a program. The later described various operation is realized by the control unit 305 executing a control program stored in the ROM 306. The RAM 307 is used to temporarily store a work memory or data when the program is executed.

The NFC communication unit 308 performs the NFC communication 103 compliant with the NFC standard. Further, upon detecting a communicatable device within a communication range, the NFC communication unit 308 automatically establishes the NFC communication 103. In the present embodiment, the NFC communication unit 308 operates as a reader/writer and can read data in an internal memory of the NFC tag unit 208. Here, it has been assumed that the NFC communication unit 308 performs wireless communication compliant with the NFC standard; however, for example, other short range wireless communication such as infrared communication (IrDA), Transfer Jet or the like or other wireless communication methods may be used. Further, the NFC communication unit 308 may use a BLE method.

The reference number 309 represents a wireless LAN communication unit that performs the wireless LAN communication 104. The wireless LAN communication unit 209 performs wireless communication compliant with IEEE 802.11 series. Here, it has been assumed in the present embodiment that the wireless LAN communication unit 309 performs wireless communication compliant with IEEE 802.11 series; however, other communication methods such as Bluetooth (registered trademark) or the like may be used.

A public communication unit 310 is connected to a public wireless base station of a mobile network operator and communicates to access telephone communication or the Internet via a public communication network.

Next, with reference to FIGS. 4 and 5, functional block diagrams of the printer 101 and smartphone 102 will be explained. In the present embodiment, the functional blocks of the printer 101 and smartphone 102 are respectively stored as programs in the ROM 206 and ROM 306, and the functions are performed by the control units 205 and 305 executing the programs. When the control units 205 and 305 execute control of each hardware and calculation or process of information according to the control programs, the respective functions are realized. Here, a part of or the entire of the functional blocks may be provided as hardware. In this case, a part of or the entire of each functional block is composed of, for example, an ASIC (Application Specific Integrated Circuit).

Figure 4:
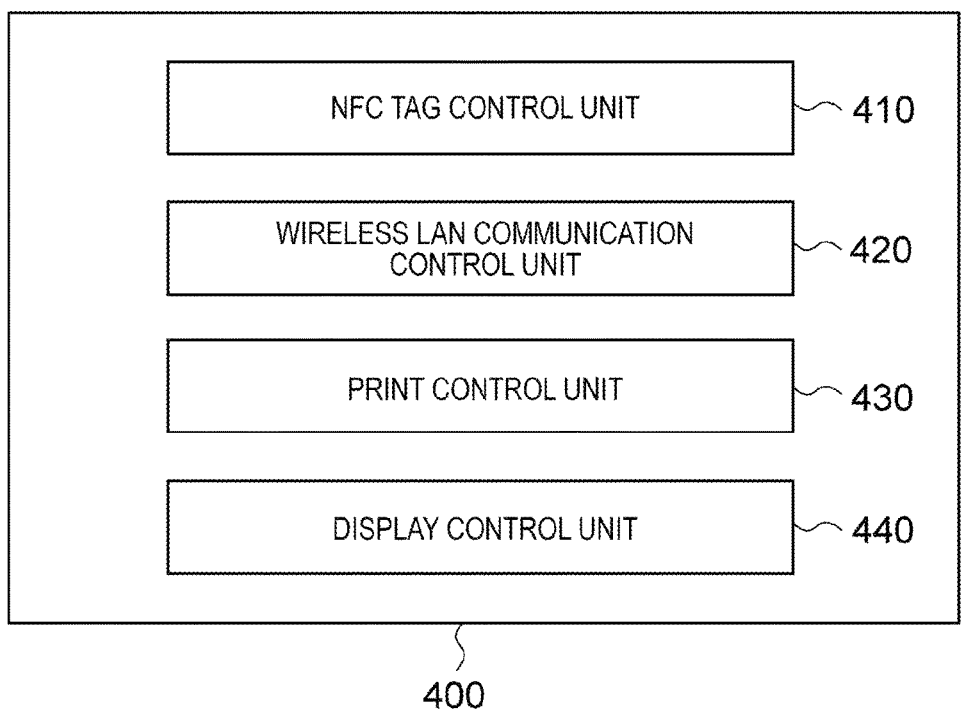
FIG. 4 is a diagram illustrating an example of a functional block configuration of the printer.

FIG. 4 is a functional block diagram (400) of the printer 101. The printer 101 includes an NFC tag control unit 410, a wireless LAN communication control unit 420, a print control unit 430, and a display control unit 440. The NFC tag control unit 410 has a function to read and write data in the internal memory of the NFC tag unit 208. Further, the NFC tag control unit 410 also has a function to detect establishment and disconnection of the NFC communication 103. The NFC tag control unit 410 measures a predetermined time period since disconnection of the NFC communication with a timer and determines whether the NFC communication is reconnected before the predetermined time period passes. Further, the NFC tag control unit 410 has a function to detect that data is read and written by an external reader/writer via the NFC communication 103.

The wireless LAN communication control unit 420 is a processor for controlling wireless LAN communication via the wireless LAN communication unit 209. Further, the wireless LAN communication control unit 420 has an STA function for operating as a station in an infrastructure mode of a wireless LAN and an AP function for operating as an access point. The print control unit 430 is a processor for executing a process by controlling the print unit 210 in response to a print request input from an external device. The display control unit 440 processes an output to the display unit 201 and an input from the operation unit 202.

Figure 5:
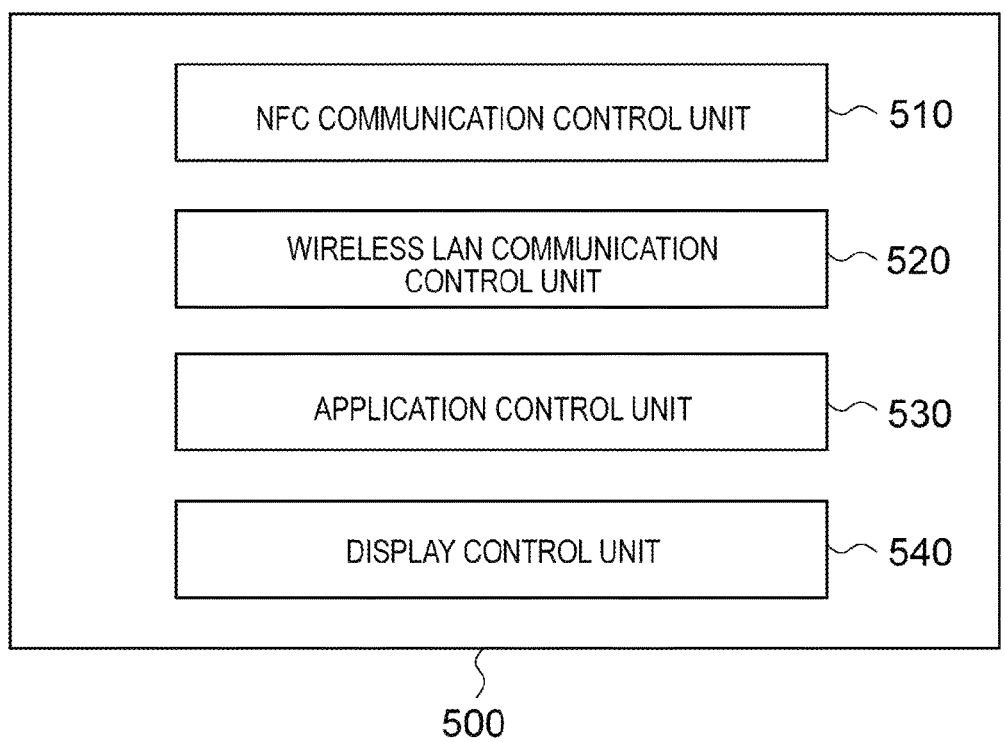
FIG. 5 is a diagram illustrating an example of a functional block configuration of the smartphone.

FIG. 5 is a functional block diagram (500) of the smartphone 102. The smartphone 102 includes an NFC communication control unit 510, a wireless LAN communication control unit 520, an application control unit 530, and a display control unit 540. The NFC communication control unit 510 is a processor for controlling the NFC communication 103 via the NFC communication unit 308. When an NFC tag is detected in the coverage of the NFC communication 103, the NFC communication control unit 510 is assumed to read data from the internal memory of the NFC tag without user's operation. When the NFC communication 103 reads later described wireless LAN setting information, the wireless LAN communication control unit 520 has a function for automatically connecting to the wireless LAN network indicated by the wireless LAN setting information, in addition to the function explained related to the wireless LAN communication control unit 420 of the printer 101. The application control unit 530 is a control unit for reading the application installed in the storage unit 303 of the smartphone to the RAM 307 and executing the application. There is also included a function for activating the application corresponding to the later described application information without user's input when the NFC communication 103 reads the application information. Further, there is also included a function for leading the user to install the application by displaying the application download site when the application corresponding to the application information has not been installed. Since other functional blocks are the same as those of the printer 101, the explanation thereof will be omitted here.

Operation of the communication system having the above configuration will be explained.

(First Embodiment)

Figure 6:
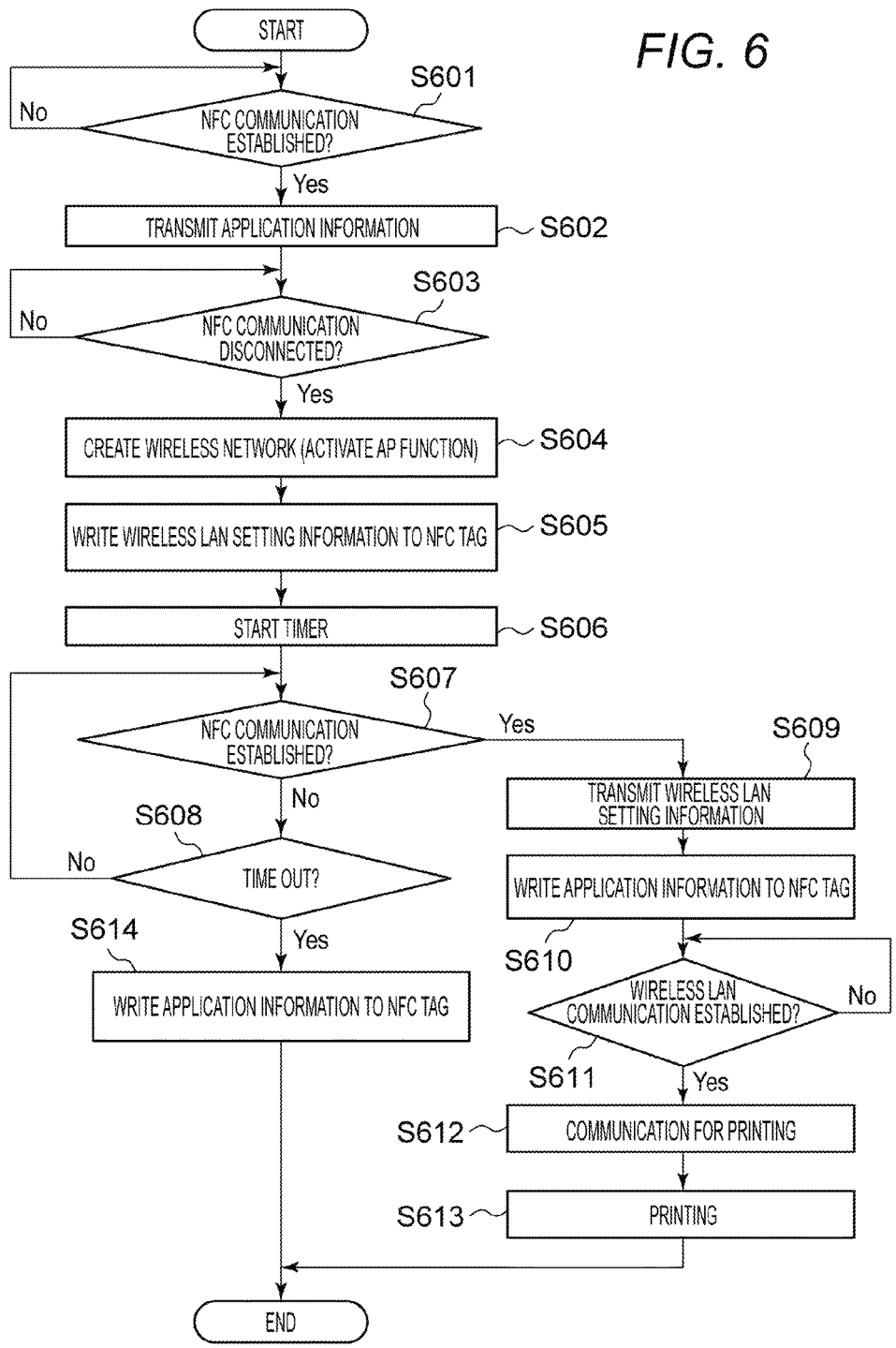
FIG. 6 is a flowchart illustrating operation of the printer.

With referring to the flowchart of FIG. 6, an operation procedure of the printer 101 according to the first embodiment will be explained. Here, the flowchart of FIG. 6 is realized by the control unit 205 executing the control program stored in the ROM 206 and executing calculation and process of information and control of each hardware. Here, a part of or the entire of the steps illustrated in the flowchart of FIG. 6 may be made to be realized by hardware such as an ASIC or the like for example.

In an initial state, it is assumed that the printer 101 is ready to accept a print job and the printer 101 and the smartphone 102 are located outside of the coverage of the NFC communication 103. Further, it is assumed that the printer 101 has written application information to the internal memory of the NFC tag unit 208. The application information is information that includes an identifier of the application which can be executed by the application control unit 530 of the smartphone 102. As described above, when the NFC communication 103 reads the application information, the smartphone 102 activates the application corresponding to the identifier or leads to a download site. In other words, the printer 101 can cause the smartphone 102 to activate the application indicated by the application information by transmitting the application information to the smartphone 102. Here, the application information stored in the internal memory of the NFC tag unit 208 in the initial state is information to select image data stored in the smartphone 102, transmit the image data to the printer 101, and activate application for printing. Here, it may be other application information.

Firstly, the NFC tag unit 208 of the printer 101 determines whether the NFC communication 103 is established (S601). Here, when the user puts the smartphone 102 in the coverage of the NFC communication 103 with the printer 101, the smartphone 102 starts the NFC communication 103. Then, the printer 101 detects that the NFC communication 103 is established according to the approach to the smartphone 102 as a reader/writer. When the NFC communication 103 is established, the printer 101 transmits application information stored in the NFC tag unit 208 to the smartphone 102 via the NFC communication 103 in response to a read command from the smartphone 102 (S602). Then, the NFC tag unit 208 of the printer 101 determines whether the NFC communication 103 has been disconnected (S603). When the user brings the smartphone 102 away from the NFC communication 103 to be outside of the coverage thereof with the printer 101, the printer 101 detects the disconnection of the NFC communication 103.

Next, the wireless LAN communication unit 209 of the printer 101 activates the AP function and creates a wireless LAN network (S604). Further, the control unit 205 of the printer 101 overwrites, in the internal memory of the NFC tag unit 208, wireless LAN setting information related to the wireless LAN network created in S602 (S605). The wireless LAN setting information includes various wireless communication parameters to perform wireless communication compliant with IEEE 802.11 standard. The wireless LAN setting information includes wireless communication parameters used to perform the wireless LAN communication such as an SSID (Service Set Identifier) as a network identifier, an encryption method, an encryption key, an authentication method, an authentication key and the like. Further, IP address for performing communication on the IP layer or the like may be included. Here, after overwriting the wireless LAN setting information, the display units 201 and 301 of the printer 101 and smartphone 102 may display information to lead establishment of NFC communication by putting the smartphone 102 closer to the printer 101 once again. Further, regarding the overwrite of the wireless LAN setting information in S603, the wireless LAN setting information may be overwritten when a predetermined period of time has passed after detecting the establishment of the NFC communication in S602.

After writing the wireless LAN setting information in S605, the control unit 205 of the printer 101 starts to measure a predetermined time period with a timer (S606). When the overwrite of the wireless LAN setting information is finished, the control unit 205 of the printer 101 determines whether the NFC communication 103 has established before the predetermined time period has passed (S607 and S608).

The determination in S607 may determine the reconnection with the communication partner device via the NFC communication 103 established in S601. In this case, when the NFC communication 103 is established, the smartphone 102 controls to write identification information to the NFC tag unit 208. Then, the printer 101 compares the identification information in the NFC tag unit 208 which is written in S601 with the identification information in the NFC tag unit 208 which is written when the subsequent NFC communication 103 is established. Then, when the written pieces of identification information correspond to each to other, the printer 101 determines the reconnection with the communication partner device of the NFC communication 103 established in S601. When the reconnection is determined, the process proceeds to later described step S609. Further, regarding the determination of the reconnection in S607, when the NFC communication 103 is established with a device which is different from the communication partner device of the NFC communication 103 established in S601, an error is displayed and the process proceeds to later described step S614.

As described above, since the reconnection is determined in S607, it is possible to prevent wireless LAN setting information from being given to an unintended device and this improves the security.

When the NFC communication 103 is established before the predetermined time period passes, the NFC tag unit 208 of the printer 101 transmits the stored wireless LAN setting information via the NFC communication 103 in response to a read command from the smartphone 102 (S609). Then, the control unit 205 of the printer 101 again overwrites the application information to the internal memory of the NFC tag unit 208 (S610). Then, the printer 101 determines whether communication of the wireless LAN communication 104 based on the transmitted wireless LAN setting information has been established (S611). When the wireless LAN communication unit 209 receives a wireless LAN connection request from the smartphone 102, the printer 101 connects the wireless LAN communication 104. Here, the establishment of the communication of the wireless LAN communication 104 cannot be detected before the predetermined time period passes, the process may proceed to step S614.

Then, when a request of print processing is received from the smartphone 102, the wireless LAN communication unit 209 of the printer 101 receives print data via the wireless LAN communication 104 (S612). Then, the printer 101 prints the received print data with the print unit 210 (S613). Here, when the printing is finished in S613, the wireless LAN network created in S604 may be ended. Further, in preparation for a further print request, the connection with the smartphone 102 via the wireless LAN communication 104 may be maintained until a disconnection instruction is received from the user.

On the other hand, when the NFC communication 103 is not established until the predetermined time period passes (YES in S608), the control unit 205 overwrites the application information in the internal memory of the NFC tag unit 208 (S614) and ends the process. Here, when the process ends, the wireless LAN network created in S604 may be ended.

Figure 7:
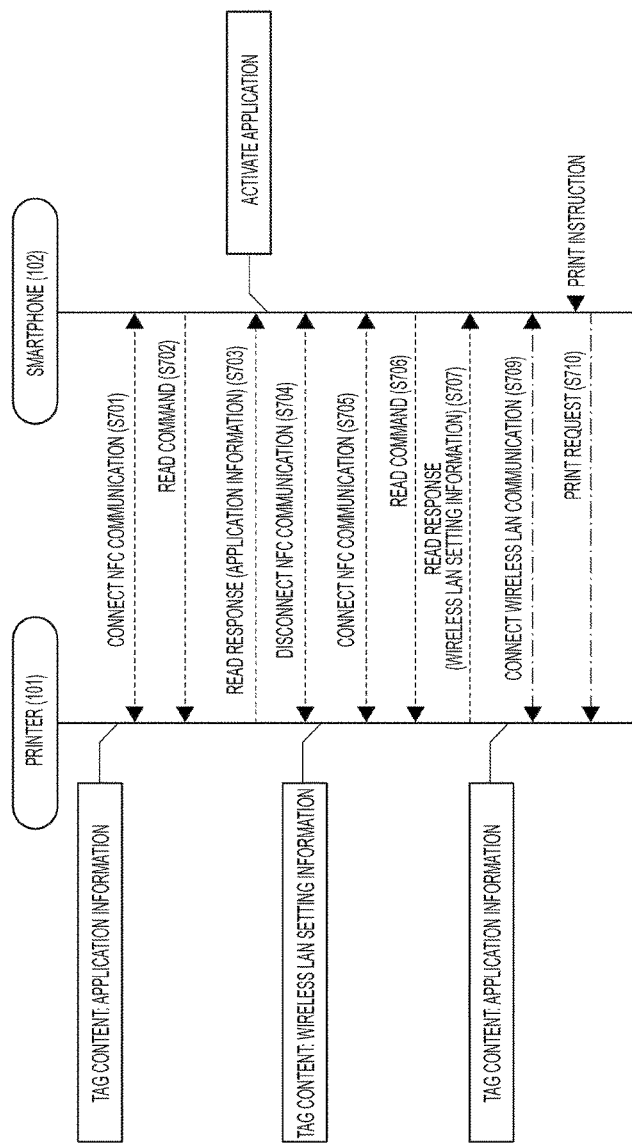
FIG. 7 is a diagram illustrating a communication sequence chart between the printer and the smartphone.

Next, an example of a communication sequence between the printer 101 and the smartphone 102 according to the first embodiment will be described in detail with reference to FIG. 7. In an initial state, the application information is written in the internal memory of the NFC tag unit 208 in the printer 101 side. When the user puts the printer 101 and the smartphone 102 close enough so that the NFC communication 103 is available, the NFC communication 103 is established between the printer 101 and the smartphone 102 (S701). When detecting the NFC tag unit 208, the smartphone 102 transmits a read command to read the internal memory of the NFC tag unit 208 to the printer 101 (S702). The NFC tag unit 208 of the printer 101 sends back a read response including the application information to the smartphone 102 (S703). Here, in this case, the smartphone 102 may write its identification information in the NFC tag unit 208. Then, the control unit 305 of the smartphone 102 activates the application corresponding to the received application information. After that, when the user puts the printer 101 and the smartphone 102 away from each other to be outside of the coverage of the NFC communication 103, the NFC communication 103 is disconnected (S704).

In this case, the printer 101 creates the wireless LAN network as an access point of the wireless LAN and writes wireless LAN setting information to connect to the wireless LAN network to the internal memory of the NFC tag unit 208. Here, after the wireless LAN setting information is written, the display unit 201 or 301 of the printer 101 or smartphone 102 may display an instruction to put the printer 101 or smartphone 102 closer again.

When the user again brings the printer 101 and the smartphone 102 closer within the coverage where the NFC communication 103 is available, the NFC communication 103 between the printer 101 and the smartphone 102 is established (S705). When detecting the NFC tag unit 208, the smartphone 102 transmits a read command to read the internal memory of the NFC tag unit 208 to the printer 101 (S706) and the NFC tag unit 208 sends back a read response including the wireless LAN setting information (S707). In this case, the smartphone 102 may write, to the NFC tag unit 208, information of the application being run in the self apparatus and the identification information of the self apparatus.

Upon receiving the wireless LAN setting information from the printer 101, the smartphone 102 connects to the wireless LAN network created by the printer 101 (S708). Further, when the user operates the operation unit 302 on the application activated by the smartphone 102 and instructs printing, the smartphone 102 transmits a print request to the printer 101 via the wireless LAN communication 104 (S709).

Here, when the print instruction by user's operation has been accepted before the connection with the wireless LAN 104 (S708), the smartphone 102 may automatically transmit print data together with the print request to the printer 101 when the wireless LAN 104 is once connected.

Here, the printer 101 may be made to determine whether the destination of the transmitted application information and the destination of transmitted wireless LAN setting information correspond to each other, for example, by transmitting device identification information. When they are not the same, an error may be displayed on the display unit 201 of the printer 101 and end the created wireless network. Further, at this point, the application information may be overwritten in the NFC tag unit 208, and the condition may be reset to the initial state (S601).

Further, it may be made to determine whether the destination of the transmitted application information and the destination of the transmitted wireless LAN setting information correspond to each other by letting the partner devices write their unique identification information and comparing them. The unique identification information of the device may be a MAC (Media Access Control) address of the smartphone 102 or other values for example.

Here, the creation of the wireless LAN network executed in S604 may be performed after the detection of the second NFC communication 103 (YES in S607).

Here, it may be made that the wireless LAN setting information is stored in the internal memory of the NFC tag unit 208 in the initial state and wireless LAN setting information is transmitted to the smartphone 102 in the first NFC communication. Then, when the wireless LAN setting information is transmitted during the first NFC communication, the application information is written in the internal memory of the NFC tag unit 208 and the application information is transmitted to the smartphone 102 during the second NFC communication.

Here, when writing of the wireless LAN setting information from the smartphone 102 is detected in S601, the wireless LAN 104 with the smartphone 102 may be performed using the written wireless LAN setting information.

As described above, according to the present embodiment, activation of an application is executed during the first NFC communication and a handover process from NFC to wireless LAN can be executed during the second NFC communication. Thus, by executing operation to bring the devices close to each other more than once, the process executed during NFC can be executed after switching and this improves the operability.

Further, in a case that the second NFC communication is not performed more than or equal to a certain time period after the first NFC communication, automatically reverting the content of the internal memory of the NFC tag improves the operability since user's operation is not needed to reset the internal memory.

Further, since the internal memory of the NFC tag is overwritten in response to disconnection of the NFC communication, update of the internal memory during processing of the read command from the smartphone is prevented so that a failure in the read process can be prevented.

Further, when the opponent devices of the first and second NFC communication are different, displaying an error in the printer side helps to notify the error to the user and this can improve the convenience.

(Second Embodiment)

Figure 8:
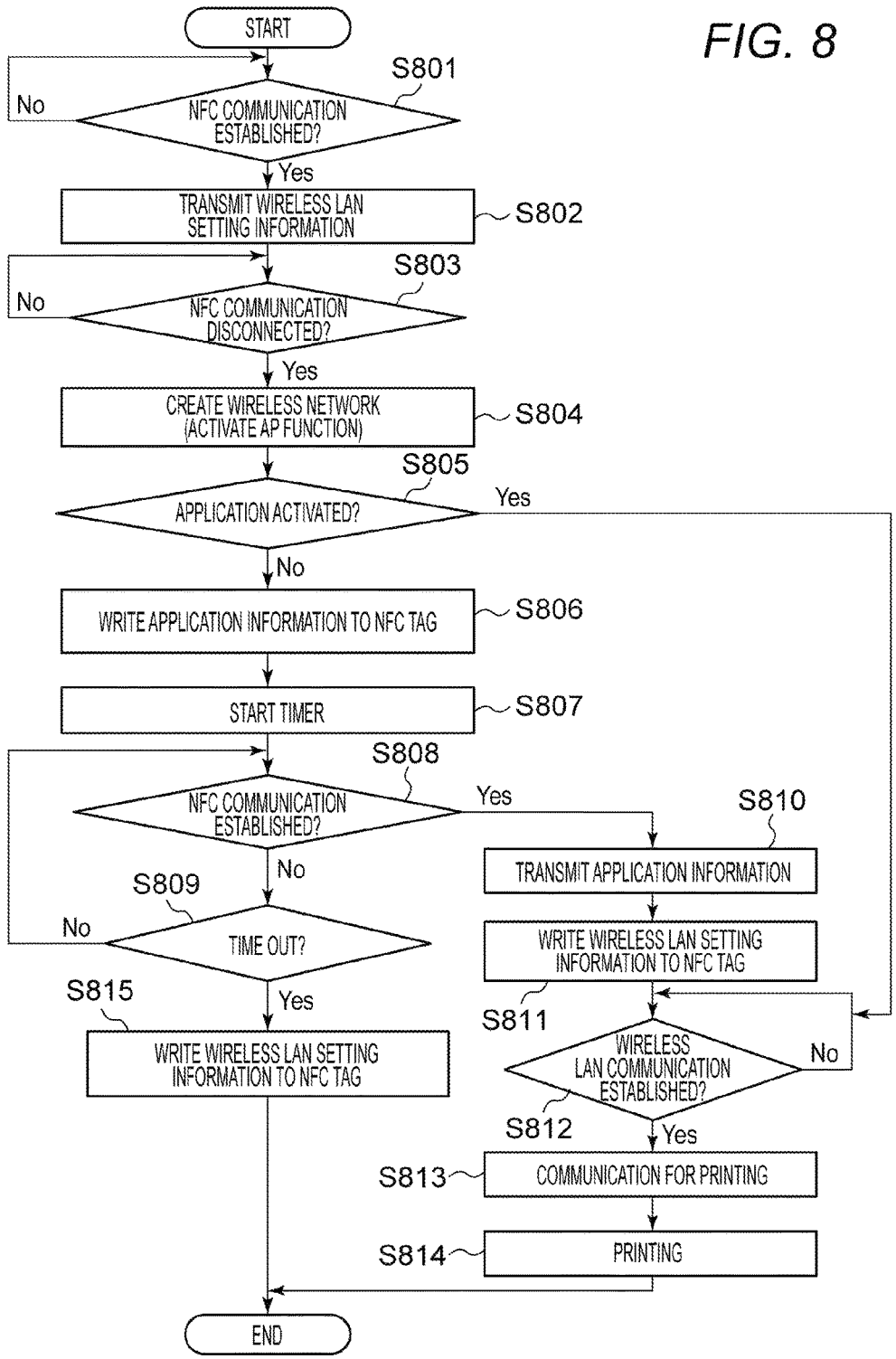
FIG. 8 is a flowchart illustrating operation of the printer.

An operation procedure of the printer 101 according to the present embodiment will be explained with reference to the flowchart of FIG. 8. Here, the flowchart illustrated in FIG. 8 is realized by the control unit 205 executing the control program stored in the ROM 206 to execute calculation and process of information and control of each hardware. Here, it may be made that a part of or the entire of the steps in the flowchart illustrated in FIG. 8 may be realized by hardware such as an ASIC or the like for example.

In the initial state, it is assumed that the printer 101 is ready to accept a print job and the printer 101 and the smartphone 102 are located outside the overage of the NFC communication 103. Further, it is assumed that the printer 101 has written wireless LAN setting information to the internal memory of the NFC tag unit 208.

Firstly, the NFC tag unit 208 of the printer 101 determines whether the NFC communication 103 is established (S801). Here, when the user puts the smartphone 102 and the printer 101 closer within the coverage of the NFC communication 103, the smartphone 102 starts the NFC communication 103. Then, the printer 101 detects that the NFC communication 103 is established, according to the approach to the smartphone 102 as a reader/writer. When the NFC communication 103 is established, the printer 101 transmits the wireless LAN setting information stored in the NFC tag unit 208 to the smartphone 102 via the NFC communication 103, in response to a read command from the smartphone 102 (S802). Then, the NFC tag unit 208 of the printer 101 determines whether the NFC communication 103 is disconnected (S803). When the user puts the smartphone 102 away outside of the coverage of the NFC communication 103 with the printer 101, the printer 101 detects the disconnection of the NFC communication 103.

Next, the wireless LAN communication unit 209 of the printer 101 activates an AP function and creates a wireless LAN network (S804). It is assumed that this wireless LAN network can be connected using the wireless LAN setting information maintained in the internal memory of the NFC tag unit 208 in the initial state. Then, the printer 101 determines whether or not the smartphone 102 has activated the application to execute print processing (S805). The smartphone 102 may write the information related to the activated application in the NFC tag unit 208 when connected in S801 and the determination may be performed based on the information. Further, as another determination method, the printer 101 may connect the wireless LAN communication 104 with the smartphone 102 and use a service discovery protocol for searching service via the wireless LAN communication 104. For example, a Simple Service Discovery Protocol (SSDP), a Multicast Domain Name System (mDNS) or the like may be used. When the application for executing print processing is activated in the smartphone 102 side, the application transmits a search packet for searching a print service to the printer 101. Upon receiving the search packet, the printer 101 can recognize that the application has been activated in the smartphone 102. Here, the printer 101 may transmit a search packet to the application of the smartphone 102 and check the activation of the application by receiving information of activated application as a response. Here, the activation of the application may be judged by receiving a print request from the smartphone 102, as a substitute for the above search protocol.

When it is determined that the smartphone 102 has not activated the application for executing print processing, the printer 101 overwrites the application information to the internal memory of the NFC tag unit 208 (S806).

When the application information is overwritten, the control unit 205 of the printer 101 starts to measure the predetermined time period with the timer (S807). When the overwriting of the application information is finished, the control unit 205 of the printer 101 determines whether the NFC communication 103 has established before the predetermined time period passes (S808 and S809).

Here, regarding the determination in S808, the reconnection of the NFC communication 103 with the communication partner device established in S801 may be determined. In this case, when the NFC communication 103 is established, the smartphone 102 writes the identification information to the NFC tag unit 208. Then, the printer 101 compares the identification information written in the NFC tag unit 208 in S801 with the identification information written in the NFC tag unit 208 when the NFC communication 103 is established. Then, when the written pieces of identification information correspond to each other, the printer 101 determines that the reconnection with the communication partner device of the NFC communication 103 established in S801 is performed. When the reconnection is determined, the process proceeds to later described step S810. Further, when the reconnection is determined in S808 and the NFC communication 103 is established with a device different from the communication partner device of the NFC communication 103 established in S801, an error may be displayed and the process may proceed to later described step S815.

In this manner, when the reconnection is determined in S808, the application information is hardly given to an unexpected different device.

When the NFC communication 103 is established before the predetermined time period passes, the NFC tag unit 208 of the printer 101 transmits the stored application information via the NFC communication 103 in response to the read command from the smartphone 102 (S801). Then, the control unit 205 of the printer 101 again overwrites the wireless LAN setting information to the internal memory of the NFC tag unit 208 (S811). Then, the printer 101 determines whether communication by the wireless LAN communication 104 based on the transmitted wireless LAN setting information has been established (S812). When the wireless LAN communication unit 209 receives a wireless LAN connection request from the smartphone 102, the printer 101 performs connection to the wireless LAN communication 104. Then, when print processing is requested by the smartphone 102, the wireless LAN communication unit 209 of the printer 101 receives print data via the wireless LAN communication 104 (S813). Then, the printer 101 prints the received print data with the print unit 210 (S814). Here, when printing is finished in S814, the wireless LAN network created in S804 may be ended.

On the other hand, when the NFC communication 103 has not established before the predetermined time period passes (YES in S809), the control unit 205 overwrites the wireless LAN setting information to the internal memory of the NFC tag unit 208 (S614) and ends the process. Here, when the process is ended, the wireless LAN network created in S804 may be ended.

Further, when it is determined in S805 that the smartphone 102 has activated the application for executing print processing, the process proceeds to S812 without rewriting the content of the memory of the NFC tag unit 208.

Next, an example of a communication sequence between the printer 101 and the smartphone 102 according to the second embodiment will be described in detail with reference to FIG. 9. In the initial state, wireless LAN setting information has been written in the internal memory of the NFC tag unit 208 in the printer 101. Further, it is assumed that, by the user's operation, the application is activated in the smartphone 102 and an image selection and a print instruction have been performed. When the user puts the printer 101 and the smartphone 102 close to each other within the overage where the NFC communication 103 is available, the NFC communication 103 is established between the printer 101 and the smartphone 102 (S901). When the NFC tag unit 208 is detected, the smartphone 102 transmits a read command to read the internal memory of the NFC tag unit 208 to the printer 101 (S902). In this case, the smartphone 102 may write, to the NFC tag unit 208, information of the application which is being activated in the self apparatus and its identification information.

When the read response including the wireless LAN setting information is sent back to the smartphone 102 (S903), the NFC tag unit 208 of the printer 101 ends the NFC communication 103 (S904). In this case, the printer 101 creates a wireless LAN network as an access point of the wireless LAN. Next, the smartphone 102 connects to the wireless LAN network created by the printer 101 based on the read wireless LAN setting information (S905). Then, the smartphone 102 transmits a search packet for searching a print service that indicates that the application which enables the print processing has been activated (S906). When the search packet is received from the application of the smartphone 102, the printer 101 transmits a response packet (S907). When receiving the response packet from the printer 101, the application of the smartphone 102 transmits a print request including what is instructed by the user in advance to the printer 101 (S908).

As described above, according to the present embodiment, the operability is improved since, when the application is activated by the user's operation in advance, the NFC communication for activating the application of the smartphone is omitted and the operation to put the devices close to each other for several times is not required.

Further, when the application is activated by user's operation in advance and print instruction is performed, only the operation to put the devices close to each other one time allows to execute the processes up to print processing, and this improves the operability.

(Other Embodiments)

Aspects of the present invention can also be realized by a process that the program that realizes one or more functions of the above embodiment is supplied to a system or a device via a network or a storage medium and one or more processor of the computer of the system or device reads and executes the program. Further, aspects of the present invention can also be realized by a circuit (for example, an ASIC) that realizes one or more of the functions.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-246353, filed Dec. 4, 2014, which is hereby incorporated by reference herein in its entirety.

What is claimed is:

1. A communication device comprising:
a first wireless communication unit configured to transmit information stored in a memory to a communication partner device via a first wireless communication system of short range wireless communication;
a second wireless communication unit configured to communicate with the communication partner device via a second wireless communication system which is different from the first wireless communication system;
a first write unit configured to write to the memory one of application information used to activate an application and setting information used to establish communication with the second wireless communication system;
a first transmission unit configured to transmit the information written by the first write unit to the communication partner device via the first wireless communication unit;
a second write unit configured to write to the memory, in a case where the transmission by the first transmission unit is performed, either the application information or the setting information, whichever was not written by the first write unit; and
a second transmission unit configured to transmit the information written by the second write unit to the communication partner device via the first wireless communication unit in a case where the communication by the first wireless communication unit starts in a condition that the writing by the second write unit is being performed.

2. The communication device according to claim 1, wherein
in a case where communication by the first wireless communication unit starts before a predetermined time period passes after the writing by the second write unit is performed, the second transmission unit transmits the information written by the second write unit to the communication partner device via the first wireless communication unit, and
in a case where communication by the first wireless communication unit does not start before the predetermined time period passes after the writing by the second write unit is performed, the communication device performs writing by the first write unit.

3. The communication device according to claim 1, wherein
in a case where the information written to the memory by the second write unit is transmitted to the communication partner device by the second transmission unit, the communication device performs writing by the first write unit.

4. The communication device according to claim 1, wherein
the first wireless communication system is near field communication.

5. The communication device according to claim 1, wherein
the first wireless communication unit communicates in a near field communication card emulation mode.

6. The communication device according to claim 1, wherein
the second wireless communication system is a communication method of at least one of wireless communication compliant with IEEE 802.11 series or Bluetooth®.

7. The communication device according to claim 1, wherein
the application information is information used to activate the application for executing print processing, and
the communication device prints data transmitted by the application from the communication partner device via the second wireless communication unit.

8. The communication device according to claim 1, wherein
in a case where the application information and the setting information are transmitted to the communication partner device, communication by the second wireless communication unit is established based on the setting information and communication with the communication partner device in which the application is activated according to the application information is performed by the second wireless communication unit.

9. A communication device comprising:
a first wireless communication unit configured to transmit information stored in a memory to a communication partner device via a first wireless communication system of short range wireless communication;
a second wireless communication unit configured to communicate with the communication partner device via a second wireless communication system which is different from the first wireless communication system;
a first transmission unit configured to transmit, to the communication partner device via the first wireless communication unit, setting information used to establish communication with the second wireless communication system;
a determination unit configured to determine, in a case where the transmission by the first transmission unit is executed, whether the communication partner device has activated a predetermined application; and
a write unit configured to write to the memory, in a case where the determination unit determines that the communication partner device has not activated the predetermined application, application information used to activate the predetermined application,
wherein communication by the second wireless communication unit is established based on the setting information and communication with the communication partner device in which the predetermined application is activated is performed by the second wireless communication unit.

10. The communication device according to claim 9, wherein in a case where the application information written to the memory by the write unit is transmitted to the communication partner device, the communication device writes the setting information to the memory.

11. The communication device according to claim 9, wherein in a case where the first wireless communication unit is not connected to the communication partner device before a predetermined time period passes after the writing by the write unit is performed, the setting information is written in the memory.

12. The communication device according to claim 9, wherein the first wireless communication system is near field communication.

13. The communication device according to claim 9, wherein the first wireless communication unit communicates in a near field communication card emulation mode.

14. The communication device according to claim 9, wherein the second wireless communication system is a communication method of at least one of wireless communication applicable with IEEE 802.11 series or Bluetooth®.

15. The communication device according to claim 9, wherein the predetermined application is an application for executing print processing, and the communication device prints data transmitted by the predetermined application from the communication partner device via the second wireless communication unit.

16. A communication method performed by a communication device including a first wireless communication unit that transmits information stored in a memory to a communication partner device via a first wireless communication system of short range wireless communication and a second wireless communication unit that communicates with the communication partner device via a second wireless communication system that is different from the first wireless communication system, the communication method comprising:

a first write step of writing to the memory one of application information used to activate an application and setting information used to establish communication with the second wireless communication system;

a first transmission step of transmitting the information written in the first write step to the communication partner device via the first wireless communication unit;

a second write step of writing to the memory, in a case where the transmission in the first transmission step is performed, either the application information or the setting information, whichever was not written in the first write step; and a second transmission step of transmitting the information written in the second write step to the communication partner device via the first wireless communication unit in a case where the communication by the first wireless communication unit starts in a condition that writing in the second write step is being performed.

17. A communication method performed by a communication device that includes a first wireless communication unit that transmits information stored in a memory to a communication partner device via a first wireless communication system of short range wireless communication and a second wireless communication unit that communicates with the communication partner device via a second wireless communication system that is different from the first wireless communication system, the communication method comprising:

a first transmission step of transmitting, to the communication partner device via the first wireless communication unit, setting information used to establish communication with the second wireless communication system,;

a determination step of determining, in a case where the transmission in the first transmission step is performed whether the communication partner device has activated a predetermined application; and a write step of writing, to the memory, in a case where it is determined, in the determination step, that the communication partner device has not activated the predetermined application, application information used to activate the predetermined application, wherein the communication by the second wireless communication unit is established based on the setting information and communication with the communication partner device in which the predetermined application is activated is performed by the second wireless communication unit.

18. A non-transitory storage medium storing computer executable instructions for causing a communication device that includes a first wireless communication unit that transmits information stored in a memory to a communication partner device via a first wireless communication system of short range wireless communication, and a second wireless communication unit that communicates with the communication partner device via a second wireless communication system that is different from the first wireless communication system to execute a control method, the control method comprising:

a first write step of writing to the memory one of application information used to activate an application and setting information used to establish communication with the second wireless communication system;

a first transmission step of transmitting information written in the first write step to the communication partner device via the first wireless communication unit;

a second write step of writing to the memory, in a case where the transmission in the first transmission step is performed, either the application information or the setting information, whichever was not written in the first write step; and a second transmission step of transmitting the information written in the second write step to the communication partner device via the first wireless communication unit in a case where the communication by the first wireless communication unit starts in a condition that writing in the second write step is being performed.

19. A non-transitory storage medium storing computer executable instructions for causing a communication device that includes a first wireless communication unit that transmits information stored in a memory to a communication partner device via a first wireless communication system of short range wireless communication, and a second wireless communication unit that communicates with the communication partner device via a second wireless communication system that is different from the first wireless communication system to execute a control method, the control method comprising:

a first transmission step of transmitting, to the communication partner device via the first wireless communication unit, setting information used to establish communication with the second wireless communication system;

a determination step of determining, in a case where the transmission in the first transmission step is performed, whether the communication partner device has activated the predetermined application; and a write step of writing to the memory, in a case where it is determined in the determination step that the communication partner device has not activated the predetermined application, application information used to activate the predetermined application, wherein communication by the second wireless communication unit is established based on the setting information and communication with the communication partner device in which the predetermined application is activated is performed via the second wireless communication unit.

* * * * *